Dec. 7, 1948.　　　　V. V. VARNUM　　　　2,455,453
HEATING INSTRUMENT

Filed Nov. 23, 1945　　　　　　　　　　　　2 Sheets-Sheet 1

Inventor

Victor V. Varnum,

By *Clarence A. O'Brien*
*and Harvey B. Jacobson*
Attorneys

Dec. 7, 1948.  V. V. VARNUM  2,455,453
HEATING INSTRUMENT
Filed Nov. 23, 1945  2 Sheets-Sheet 2
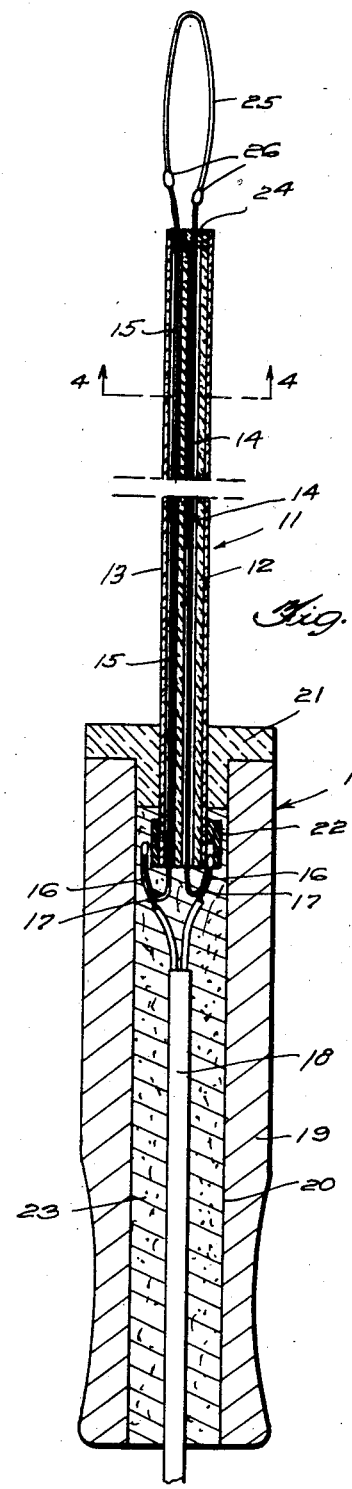
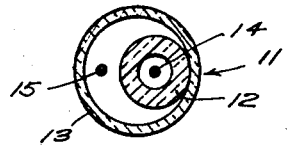
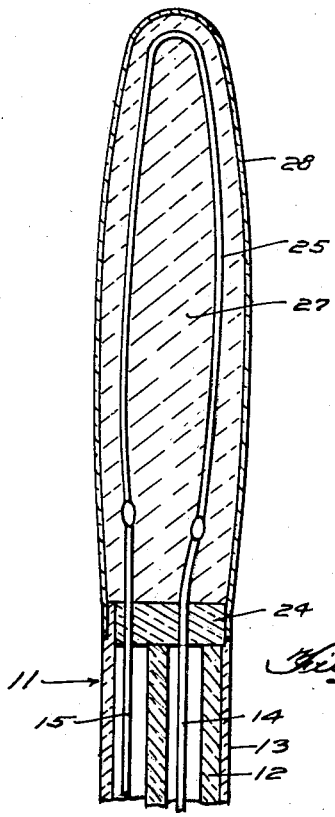
Inventor
Victor V. Varnum,
By Clarence A. O'Brien
and Harvey B. Jacobson
Attorneys Patented Dec. 7, 1948

2,455,453

UNITED STATES PATENT OFFICE 2,455,453

HEATING INSTRUMENT

Victor V. Varnum, Tama, Iowa

Application November 23, 1945, Serial No. 630,324

2 Claims. (Cl. 219—29)

This invention relates to a heating instrument and has for its primary object to reestablish communication through a tubular member of small diameter after the latter has become plugged with a fusable substance such as rubber.

In the manufacture and repair of innertubes such as are used on motor vehicles and particularly when vulcanizing the valve stem into the tube the plastic rubber will flow into the stem so as to seal it and prevent the introduction of air into the tube or the passage of air from the interior thereof. When such conditions obtain it becomes necessary to break the seal through the valve stem and to this end it has been a matter of common practice to heat a short length of wire to incandescence and to introduce it into the valve stem to melt the rubber which is closing the opening therethrough. Due to the rapid dissipation of the heat from a wire when thus used it is frequently necessary to re-heat the wire several times before completing the opening of the passage in the valve stem with the result of great loss of time.

Another object of this invention is to facilitate the opening of the passage through a sealed valve stem and effect economies in so doing.

The above and other objects may be attained by employing this invention which embodies among its features an instrument for burning rubber out of the valve stem which comprises a pair of tubular members of flexible heat resistant nonconducting material such as fibre glass, one of which contains a conductor through its bore while the other contains a coextensive conductor, a filament bridging the ends of the conductors beyond the termini of the tubular members, a handle at the opposite ends of the tubular members and means to supply electrical energy to the conductors to cause the filament to be heated to incandescence.

In the drawings:

Figure 3 is a vertical sectional view through the instrument by which the actual burning is accomplished.

Figure 4 is a transverse sectional view taken substantially on the line 4—4 of Figure 3.

Figure 5 is an enlarged fragmentary sectional view through a modified form of burning device.

Figure 1:
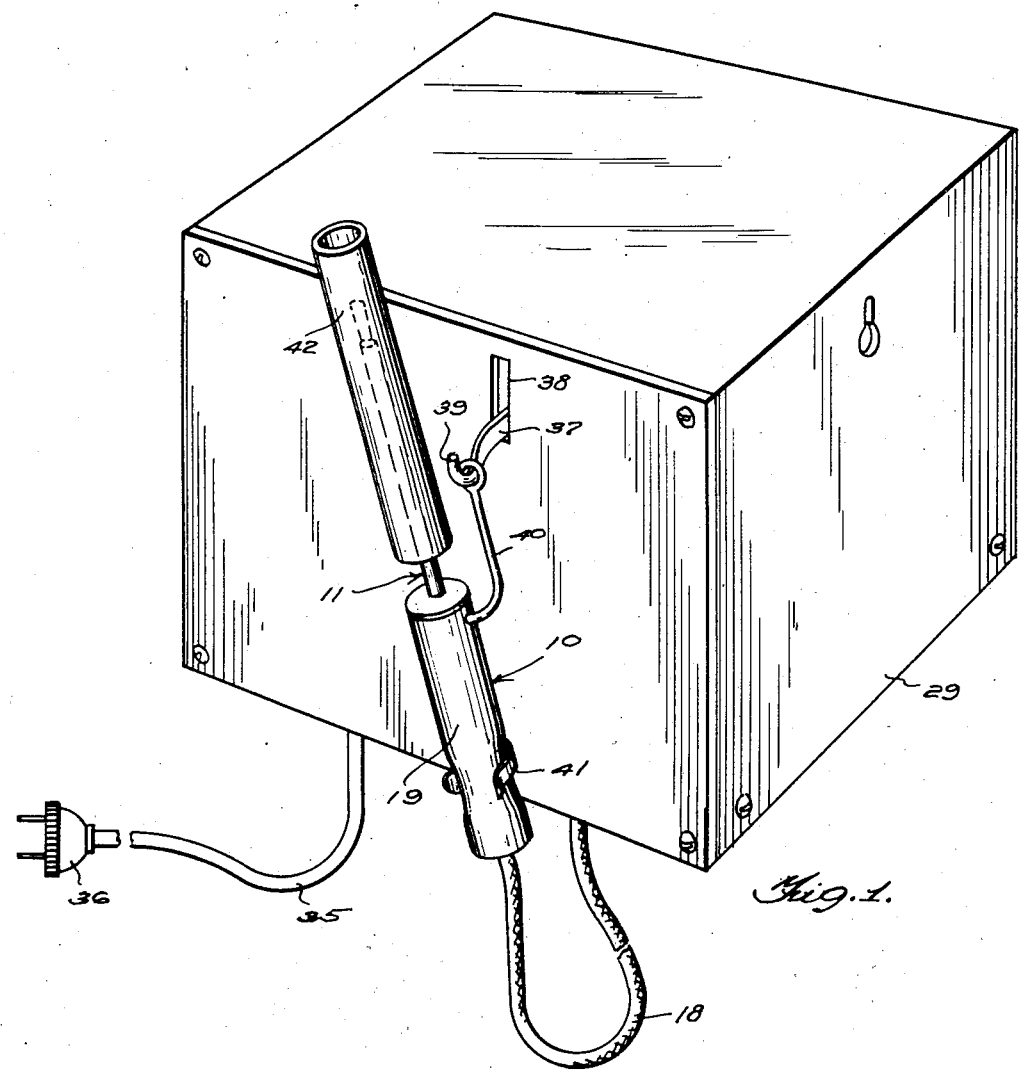
Figure 1 is a perspective view of a complete unit for use in clearing a sealed valve stem.
Figure 2:
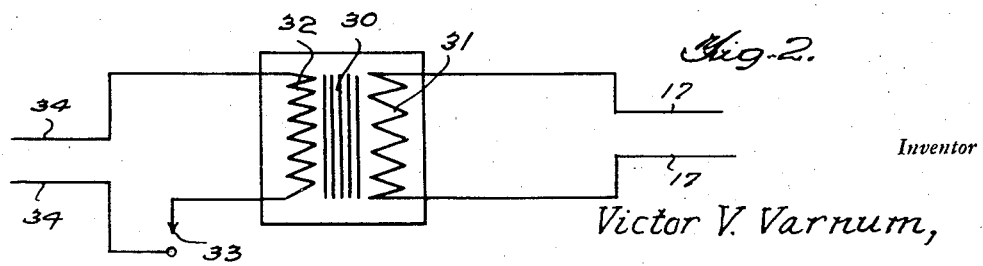
Figure 2 is a diagrammatic view of the electrical connections employed.

Referring to the drawings in detail, my improved burning instrument designated generally 10 comprises a shaft designated generally 11 which is formed from a tubular core member 12 of flexible, heat resistant, non-conducting material such as fibre glass which has been braded into such tubular form in the customary manner. This core is surrounded by a casing 13 of slightly larger internal diameter than the external diameter of the core 12 which like the core 12 is formed from a flexible, heat resistant, non-conducting material such as braded fibre glass. The core 12 and the casing 13 are substantially co-extensive in length and extending through the core 12 is a conductor 14 while a similar conductor 15 extends through the casing between the exterior of the core and the interior of the casing so as to be held in spaced insulated relation to the conductor 14. The lower end of each conductor extends beyond the ends of the core 12 and the casing 13 and are bent back upon themselves as at 16 and soldered or otherwise permanently connected to the lead wires or conductors 17 of a cable 18. A handle 19 provided with a longitudinal bore 20 surrounds a portion of the conductor 18 adjacent the ends of the core 12 and casing 13 and this handle is provided with a suitable attaching bushing 21 into which the one end of the shaft 11 is fitted. The junctions of the conductors and lead wires 17 are preferably incompassed within a ceramic enclosure 22 and the bore 20 is packed with a suitable cementitious material 23 which will serve to hold the parts assembled.

Arranged within the upper end of the casing 13 and in abutting relation to the upper end of the core 12 is a ceramic disc 24 having spaced openings through which the upper ends of the conductors 14 and 15 extend. A filament 25 bridges the upper ends of the conductors 14 and 15 and is welded or otherwise attached as at 26 to the ends of the conductors. As illustrated this filament 25 is arranged in an elongated loop so that its opposite legs do not extend beyond the circumferential confines of the casing 13, it being understood of course that the external diameter of the entire shaft 11 is such as readily to enter the interior of a valve stem.

In the modification illustrated in Figure 5 the filament 25 is preferably embedded in a support 27 of a suitable ceramic material, it being understood that the filament is placed close enough to the surface so that the ceramic material will become heated through conductivity and radiation to effect the desired operation. A suitable thimble 28 encases the exterior of the ceramic material and is clamped or otherwise fastened to the exterior of the casing 13 at the junction of the casing and the bushing or disc 24. It will thus be seen that the filament will be reinforced and supported in proper position at all times.

In order to afford a suitable power supply for heating the filament the end of the cable 18 opposite that entering the handle 19 enters a suitable housing 29 containing a transformer 30 and the terminals of the conductors or lead wires 17 are connected to opposite terminals of the secondary 31 of the transformer while the primary 32 is connected through a switch 33 to the conductors 34 of a suitable cable 35 provided with the customary contact plug 36 by means of which communication of the transformer with a suitable power line may be effected. The switch 33 is provided with a lever 37 which extends outwardly through a slot 38 in the casing 29 and carries at its outer end a hook 39 for engagement with a bracket 40 which may be attached to the handle 19 so that when the instrument 10 is hung on the hook 39 the power to the transformer 30 will be interrupted and when the instrument is removed from the hook for use the flow of current through the transformer will automatically be restored. A suitable spring clip 41 may be attached to the casing 29 in such a position that when the instrument 10 is on the hook, the legs of the clip 41 will engage the handle 19 to hold the device in place. A protecting thimble 42 may be slipped over the end of the shaft 11 effectively to prevent injury to the shaft and filament when it is in place on the casing 29.

The operation of the device is more or less obvious as it will be understood that when the instrument 10 is removed from the hook 39 power will be supplied to the primary 32 of the transformer 30 thus exciting the secondary 31 and inducing a flow of current through the leads 17, conductors 14 and 15 to the filament 25 which will become heated to incandescence. The instrument may then be inserted into a sealed valve stem so as to melt out the rubber and when the operation has been completed the instrument is restored to the hook 39 thus shutting off further supply of power to the transformer 30.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

1. An instrument for burning rubber out of a valve stem which includes, a shaft comprising a tubular core of flexible, heat-resistant, non-conducting material, a conductor enclosed by and extending throughout the length of the core, a tubular casing of flexible, heat-resistant non-conducting material coextensive with and enclosing said core, a conductor coextensive with the first mentioned conductor between the exterior of the core and the interior of the casing, a heat generating filament bridging the conductors at one end of the shaft, a handle at the opposite end of the shaft and means to supply electrical energy to the conductors to heat the filament to incandescence, and a body of ceramic material reinforcing said filament.

2. An instrument for burning rubber out of a valve stem which includes, a shaft comprising a tubular core of flexible, heat-resistant, non-conducting material, a conductor enclosed by and extending throughout the length of the core, a tubular casing of flexible, heat-resistant non-conducting material coextensive with and enclosing said core, a conductor coextensive with the first mentioned conductor between the exterior of the core and the interior of the casing, a heat generating filament bridging the conductors at one end of the shaft, a handle at the opposite end of the shaft and means to supply electrical energy to the conductors to heat the filament to incandescence, and a body of ceramic material reinforcing said filament, and a protective cap enclosing said ceramic material.

VICTOR V. VARNUM.

REFERENCES CITED

The following references are of record in the file of this patent:

UNITED STATES PATENTS

| Number | Name | Date |
| --- | --- | --- |
| 495,929 | Carter et al. | Apr. 18, 1893 |
| 774,624 | Waters et al. | Nov. 8, 1904 |
| 2,050,904 | Trice | Aug. 11, 1936 |
| 2,411,549 | Lindberg | Nov. 26, 1946 |

OTHER REFERENCES

Betz Company Catalog of 1927, page 104.